United States Patent
Hicks et al.

(10) Patent No.: US 11,010,285 B2
(45) Date of Patent: May 18, 2021

(54) FAULT DETECTION AND LOCALIZATION TO GENERATE FAILING TEST CASES USING COMBINATORIAL TEST DESIGN TECHNIQUES

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Rawlins, New Paltz, NY (US); Rachel Brill, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 16/256,388

(22) Filed: Jan. 24, 2019

(65) Prior Publication Data

US 2020/0242012 A1    Jul. 30, 2020

(51) Int. Cl.
*G06F 11/36* (2006.01)
*G06F 11/263* (2006.01)

(52) U.S. Cl.
CPC ........ *G06F 11/3684* (2013.01); *G06F 11/263* (2013.01); *G06F 11/3676* (2013.01); *G06F 11/3692* (2013.01)

(58) Field of Classification Search
CPC ............. G06F 11/3684; G06F 11/3692; G06F 11/3688; G06F 11/3612; G06F 11/3672; G06F 11/3466; G06F 11/3676
See application file for complete search history.

(56) References Cited

U.S. PATENT DOCUMENTS

| 5,153,881 A | 10/1992 | Bruckert |
| 5,185,877 A | 2/1993 | Bissett |
| 5,694,540 A | 12/1997 | Humelsine |
| 5,758,062 A | 5/1998 | McMahon |
| 6,378,097 B1 * | 4/2002 | Fin ..................... G06F 11/2236 714/738 |
| 6,415,396 B1 * | 7/2002 | Singh .................. G06F 11/3688 714/25 |
| 6,859,922 B1 | 2/2005 | Baker |

(Continued)

FOREIGN PATENT DOCUMENTS

| WO | 2016138953 A1 | 9/2016 |
| WO | 2018162048 A1 | 9/2018 |

OTHER PUBLICATIONS

Anonymous, "A Method and System for Providing Collaborative Platform as a Service for Aiding Machine Learning Development," IP.com (IPCOM000256095D). Nov. 2, 2018. 5 pages.

(Continued)

*Primary Examiner* — Nadeem Iqbal
(74) *Attorney, Agent, or Firm* — Cantor Colburn LLP; Teddi Maranzano

(57) ABSTRACT

Systems, methods, and computer-readable media are described for performing fault detection and localization using Combinatorial Test Design (CTD) techniques and generating a regression bucket of test cases that expose a detected fault in a System Under Test (SUT). The SUT may be a hardware system or a software system. Further, the fault detection and localization may be performed while adhering to architectural restrictions on the SUT.

20 Claims, 6 Drawing Sheets

(56) References Cited

U.S. PATENT DOCUMENTS

| | | | |
|---|---|---|---|
| 7,093,238 B2 | 8/2006 | Givoni | |
| 7,178,063 B1 | 2/2007 | Smith | |
| 7,315,634 B2 | 1/2008 | Martin | |
| 7,552,425 B2 | 6/2009 | Bates et al. | |
| 7,596,778 B2 | 9/2009 | Kolawa | |
| 7,617,074 B2 | 11/2009 | Beish | |
| 7,640,470 B2 | 12/2009 | Lammel | |
| 7,640,740 B2 | 1/2010 | Lammel | |
| 7,721,265 B1 | 5/2010 | Xu | |
| 7,945,898 B1 | 5/2011 | Episkopos et al. | |
| 7,958,400 B2 | 6/2011 | Ur | |
| 7,962,798 B2 | 6/2011 | Locasto | |
| 8,296,605 B2 | 10/2012 | John | |
| 8,301,757 B2 | 10/2012 | Catlin | |
| 8,370,816 B2 | 2/2013 | Farchi et al. | |
| 8,479,171 B2 | 7/2013 | Ghosh | |
| 8,527,813 B2 | 9/2013 | Budnik | |
| 8,554,811 B2 | 10/2013 | Mariani | |
| 8,649,995 B2 | 2/2014 | Thulasidasan et al. | |
| 8,756,460 B2 | 6/2014 | Blue et al. | |
| 8,775,886 B2 | 7/2014 | Mellen | |
| 8,806,450 B1 | 8/2014 | Maharana | |
| 8,949,674 B2 | 2/2015 | Mancoridis | |
| 8,954,926 B2 | 2/2015 | Braun et al. | |
| 8,954,930 B2 | 2/2015 | Kamenz | |
| 8,997,061 B1 | 3/2015 | Davison | |
| 9,009,538 B2* | 4/2015 | D'Alterio | G06F 11/3684 714/38.1 |
| 9,037,915 B2* | 5/2015 | D'Alterio | G06F 11/3692 714/38.1 |
| 9,063,899 B2 | 6/2015 | Epstein | |
| 9,098,635 B2 | 8/2015 | Peri-Glass et al. | |
| 9,111,033 B2 | 8/2015 | Bates | |
| 9,202,005 B2 | 12/2015 | Goswami et al. | |
| 9,286,313 B1 | 3/2016 | Sharangpani | |
| 9,336,122 B2 | 5/2016 | Kilzer et al. | |
| 9,454,466 B2 | 9/2016 | Ivrii et al. | |
| 9,489,289 B2 | 11/2016 | Hu | |
| 9,513,998 B2 | 12/2016 | Coronado | |
| 9,529,701 B2 | 12/2016 | Ekambaram et al. | |
| 9,600,403 B1 | 3/2017 | Raz | |
| 9,720,766 B2 | 8/2017 | Lee | |
| 9,734,263 B2 | 8/2017 | Kohavi et al. | |
| 9,779,013 B2 | 10/2017 | Narayan et al. | |
| 9,857,959 B2 | 1/2018 | Dhawal | |
| 9,864,675 B2 | 1/2018 | Ug | |
| 9,916,414 B2 | 3/2018 | Jeong | |
| 10,073,763 B1 | 3/2018 | Raman | |
| 9,990,272 B2 | 6/2018 | Cooper | |
| 9,996,452 B2 | 6/2018 | Cooper et al. | |
| 10,061,685 B1 | 8/2018 | White | |
| 10,152,479 B1 | 12/2018 | Granstrom | |
| 10,296,446 B2* | 5/2019 | D'Andrea | G06F 11/3672 |
| 10,338,993 B1* | 7/2019 | Lekivetz | G06F 11/3692 |
| 10,383,553 B1 | 8/2019 | Glenn | |
| 10,430,318 B1 | 10/2019 | Ansari | |
| 2003/0233600 A1 | 12/2003 | Hartman | |
| 2004/0154001 A1 | 8/2004 | Haghighat et al. | |
| 2006/0179386 A1 | 8/2006 | Pushpavanam | |
| 2008/0065931 A1 | 3/2008 | Coulter | |
| 2008/0163165 A1 | 7/2008 | Shitrit | |
| 2008/0172652 A1 | 7/2008 | Davia et al. | |
| 2009/0249123 A1 | 10/2009 | Chow | |
| 2010/0023931 A1 | 1/2010 | Hentschel et al. | |
| 2010/0100871 A1 | 4/2010 | Celeskey | |
| 2010/0287534 A1 | 11/2010 | Vangala et al. | |
| 2011/0016457 A1* | 1/2011 | Artzi | G06F 9/454 717/131 |
| 2011/0145653 A1 | 6/2011 | Broadfoot | |
| 2012/0191443 A1 | 7/2012 | Amalfitano | |
| 2012/0253728 A1 | 10/2012 | Chamas | |
| 2012/0260132 A1 | 10/2012 | Blue | |
| 2013/0152047 A1 | 6/2013 | Moorthi | |
| 2014/0013307 A1 | 1/2014 | Hansson | |
| 2014/0059081 A1 | 2/2014 | Farchi et al. | |
| 2014/0095933 A1 | 4/2014 | Griesinger | |
| 2014/0372083 A1 | 12/2014 | Hsu et al. | |
| 2015/0094997 A1 | 4/2015 | Ivrii et al. | |
| 2015/0106653 A1 | 4/2015 | Adler et al. | |
| 2016/0378618 A1 | 12/2016 | Cmielowski et al. | |
| 2017/0060734 A1 | 3/2017 | Raz et al. | |
| 2017/0103013 A1 | 4/2017 | Grechanik | |
| 2017/0132119 A1 | 5/2017 | Xu et al. | |
| 2017/0199810 A1 | 7/2017 | Hamilton | |
| 2017/0262361 A1 | 9/2017 | Francis | |
| 2017/0270035 A1 | 9/2017 | Nie | |
| 2018/0024911 A1 | 1/2018 | Kruszewski et al. | |
| 2018/0052725 A1 | 2/2018 | Hannson | |
| 2018/0095867 A1 | 4/2018 | Varadarajan et al. | |
| 2018/0293156 A1 | 10/2018 | Zeng | |
| 2018/0300226 A1 | 10/2018 | Manolios | |
| 2018/0314577 A1* | 11/2018 | Gorjiara | G06N 20/00 |
| 2018/0329807 A1 | 11/2018 | Atyam | |
| 2019/0332523 A1 | 10/2019 | Gefen | |
| 2020/0242011 A1 | 7/2020 | Hicks | |
| 2020/0242012 A1 | 7/2020 | Hicks | |
| 2020/0242013 A1 | 7/2020 | Hicks | |

OTHER PUBLICATIONS

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

Anonymously Disclosed "Method for a debugging tool for finding variable value in application stack", IP.com No. IPCOM000209789D, Publication Date: Aug. 15, 2011, 5 pages.

Anonymously Disclosed "Method to enable debugger breakpoint inside statement", IP.com No. IPCOM000206941D, Publication Date: May 13, 2011, 8 pages.

Anonymously Disclosed "Simple Automated Code Coverage Method for test metrics", IP.com No. IPCOM000201864D, Publication Date: Nov. 29, 2010, 6 pages.

Anonymously Disclosed "Structured enhanced breakpoint chain", IP.com No. IPCOM000244264D, Publication Date: Nov. 27, 2015, 4 pages.

Anonymously Disclosed "System and method for improved regression failure analysis and easier debugging of test failures", IP.com No. IPCOM000209599D, Publication Date: Aug. 10, 2011, 6 pages.

Astigarraga, Tara "IBM Test Overview and Best Practices", IBM, Nov. 2012, pp. 1-53.

Cohen, D. M. et al., "The AETG system: An approach to testing based on combinatorial design." IEEE Transactions on Software Engineering, 23(7), pp. 437-444. Jul. 1997.

Compuware Corporation "Validate Testing Thoroughness and Provide Application Analysis", 2014, 4 pages.

De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.

Devai, Gergely et al., "UML Model Execution via Code Generation" Eotvos Lorand University, Faculty of Informatics, Budapest, Hungary 2017, pp. 9-15.

Hicks et al., "Champion Test Case Generation", U.S. Appl. No. 16/256,949, filed Jan. 24, 2019.

Hicks et al., "Combinatoric Set Completion Through Unique Test Case Generation", U.S. Appl. No. 16/256,394, filed Jan. 24, 2019.

(56) References Cited

OTHER PUBLICATIONS

Hicks et al., "Fault Detection and Localization Using Combinatorial Test Design Techniques While Adhering to Archtiectural", U.S. Appl. No. 16/256,391, filed Jan. 24, 2019.

Hicks et al., "Reduction of Test Infrastructure", U.S. Appl. No. 16/440,781, filed Jun. 13, 2019.

Hicks et al., "Self Healing Software Utilizing Regression Test Fingerprints", U.S. Appl. No. 16/440,833, filed Jun. 13, 2019.

Hicks et al., "Test Space Analysis Across Multiple Combinatoric Models", U.S. Appl. No. 16/256,388, filed Jan. 24, 2019.

Hicks et al., "Associating Attribute Seeds of Regression Test Cases With Breakpoint Value-Based Fingerprints," U.S. Appl. No. 16/440,857, filed Jun. 13, 2019.

Hicks et al., "Breakpoint Value-Based Version Control," U.S. Appl. No. 16/440,800, filed Jun. 13, 2019.

Hicks et al., "Customizable Test Set Selection Using Code Flow Trees," U.S. Appl. No. 16/440,751, filed Jun. 13, 2019.

Hicks et al., "Fault Detection Using Breakpoint Value-Based Fingerprints of Failing Regression Test Cases," U.S. Appl. No. 16/440,810, filed Jun. 13, 2019.

Hicks et al., "Regression Test Fingerprints Based on Breakpoint Values," U.S. Appl. No. 16/440,404, filed Jun. 13, 2019.

IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.

IBM, "InspectioN Testing Using Debugging Capabilities to Allow Combinational Testing", IP.com No. IPCOM000188370D, Electronic Publication Date: Oct. 2, 2009, 3 pages.

IBM, "Tool and Strategy for testing and validating software components at the source code level", IP.com No. IPCOM000180330D, Publication Date: Mar. 6, 2009, 3 pages.

IBM, Method of preventing build failures by searching through levels in a multi-level revision control system IP.com No. IPCOM000179779D, Publication Date: Feb. 25, 2009, 3 pages.

Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.

Kuhn, Rick "Introduction to Combinatorial Testing", NIST, Carnegie-Mellon University, Jun. 7, 2011, 48 pages.

Leon et al., "An empirical evaluation of test case filtering techniques based on exercising complex information flows," Proceedings of the 27th International Conference on Software Engineering, pp. 412-421. ACM, 2005.

Kamalakar, Sunil, "Automatically Generating Tests from Natural Language Descriptions of Software Behavior," Virginia Polytechic Institute and State University, Sep. 23, 2013. 72 pages.

List of IBM Patents or Patent Applications Treated as Related; Date Filed: Jul. 11, 2019, 2 pages.

Mathur et al., "Adaptive Automation: Leveraging Machine Learning to Support Uninterrupted Automated Testing of Software Applications" arXiv.org, Aug. 4, 2015. 6 pages.

Nguyen et al., "Combining model-based and combinatorial testing for effective test case generation," Proceedings of the 2012 International Symposium on Software Testing and Analysis, Jul. 15-20, 2012. pp. 100-110.

Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.

Segall "Combinatorial Test Design" IBM Haifa Research Labs, 2012, pp. 1-49.

Shakya, K. & Xie, T., "Isolating Failure-Inducing Combinations in Combinatorial Testing using Test Augmentation and Classification", CT 2012 workshop, (23 pages).

Soffa, Mary Lou et al. Exploiting Hardware Advances for Software Testing and Debugging (NIER Track) ICSE '11; May 21-28, 2011; 4 pgs.

Yilmaz et al., "Moving forward with combinatorial interaction testing," Computer, 47(2). Feb. 2014. pp. 37-45.

Willmor, David, and Suzanne M. Embury, "A safe regression test selection technique for database-driven applications." 21st IEEE International Conference on Software Maintenance (ICSM'05). IEEE, 2005.pp. 1-10 (Year: 2005).

"All pair testing" wikipedia page from dated Sep. 14, 2017, retrieved using the WayBackMachine, from https://web.archive.org/web/20170914145543/https://en.wikipedia.org/wiki/All-pairs_testing (Year: 2017).

"CPC Cooperative Patent Classification, G06F Electrical Digital DAT Processing" of Apr. 2015, retrieved from https://www.cooperativepatentclassification.org/cpc/ (Year: 2015).

Bromme et al., "A Conceptual Framework for Testing Biometric Algorithms within Operating Systems' Authentication", ACM, pp. 273-280 (Year: 2002).

Orso, Alessandro, Nanjuan Shi, and Mary Jean Harrold. "Scaling regression testing to large software systems." ACM SIGSOFT Software Engineering Notes 29.6 (2004): pp. 241-251. (Year: 2004).

Rothermel et al., "Analyzing Regression Test Selection Techniques", IEEE, pp. 529-551 (Year: 1996).

Wikipedia "Cartesian Product" web page, from date Jan. 15, 2019, retrieved from https://web.archive.org/web/20190115231627/https://en.wikipedia.org/wiki/Cartesian_product (Year: 2019).

Yi, Qiuping, et al. "A synergistic analysis method for explaining failed regression tests." 2015 IEEE/ACM 37th IEEE International Conference on Software Engineering. vol. 1. IEEE, 2015.pp. 257-267 (Year 2015).

Yimaz et al., "Moving forward with combinatorial interaction testing", Feb. 2014, 47(2), pp. 37-45.

\* cited by examiner

FAULT DETECTION AND LOCALIZATION TO GENERATE FAILING TEST CASES USING COMBINATORIAL TEST DESIGN TECHNIQUES

BACKGROUND

The present invention relates generally to fault detection and localization to generate failing test cases, and more particularly, to utilizing combinatorial test design to detect and localize a fault and to generate a regression bucket of failing test cases corresponding to the fault.

Combinatorial Test Design (CTD) is a testing methodology that seeks to increase test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester. Despite this, CTD testing techniques suffer from various drawbacks, technical solutions to which are described herein.

SUMMARY

In one or more example embodiments, a method for detecting and localizing a fault in a System Under Test (SUT) is disclosed. The method includes modeling inputs to the SUT as a collection of attribute-value pairs and generating an initial set of test vectors that provides complete n-wise coverage of a test space associated with the collection of attribute-value pairs. The method further includes generating an initial set of test cases from the initial set of test vectors and executing the initial set of test cases to obtain a first set of execution results. The method additionally includes determining, based at least in part on the first set of execution results, that one or more test cases failed execution and generating a set of new test cases from a selected failing test case. Generating the set of new test cases includes changing a respective attribute value in the selected failing test case to generate each new test case. The method further includes executing the set of new test cases to obtain a second set of execution results and detecting and localizing the fault based at least in part on the second set of execution results In one or more other example embodiments, a system for detecting and localizing a fault in a System Under Test (SUT) is disclosed. The system includes at least one memory storing computer-executable instructions and at least one processor configured to access the at least one memory and execute the computer-executable instructions to perform a set of operations. The operations include modeling inputs to the SUT as a collection of attribute-value pairs and generating an initial set of test vectors that provides complete n-wise coverage of a test space associated with the collection of attribute-value pairs. The operations further include generating an initial set of test cases from the initial set of test vectors and executing the initial set of test cases to obtain a first set of execution results. The operations additionally include determining, based at least in part on the first set of execution results, that one or more test cases failed execution and generating a set of new test cases from a selected failing test case. Generating the set of new test cases includes changing a respective attribute value in the selected failing test case to generate each new test case. The operations further include executing the set of new test cases to obtain a second set of execution results and detecting and localizing the fault based at least in part on the second set of execution results.

In one or more other example embodiments, a computer program product for detecting and localizing a fault in a System Under Test (SUT) is disclosed. The computer program product includes a non-transitory storage medium readable by a processing circuit, the storage medium storing instructions executable by the processing circuit to cause a method to be performed. The method includes modeling inputs to the SUT as a collection of attribute-value pairs and generating an initial set of test vectors that provides complete n-wise coverage of a test space associated with the collection of attribute-value pairs. The method further includes generating an initial set of test cases from the initial set of test vectors and executing the initial set of test cases to obtain a first set of execution results. The method additionally includes determining, based at least in part on the first set of execution results, that one or more test cases failed execution and generating a set of new test cases from a selected failing test case. Generating the set of new test cases includes changing a respective attribute value in the selected failing test case to generate each new test case. The method further includes executing the set of new test cases to obtain a second set of execution results and detecting and localizing the fault based at least in part on the second set of execution results.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
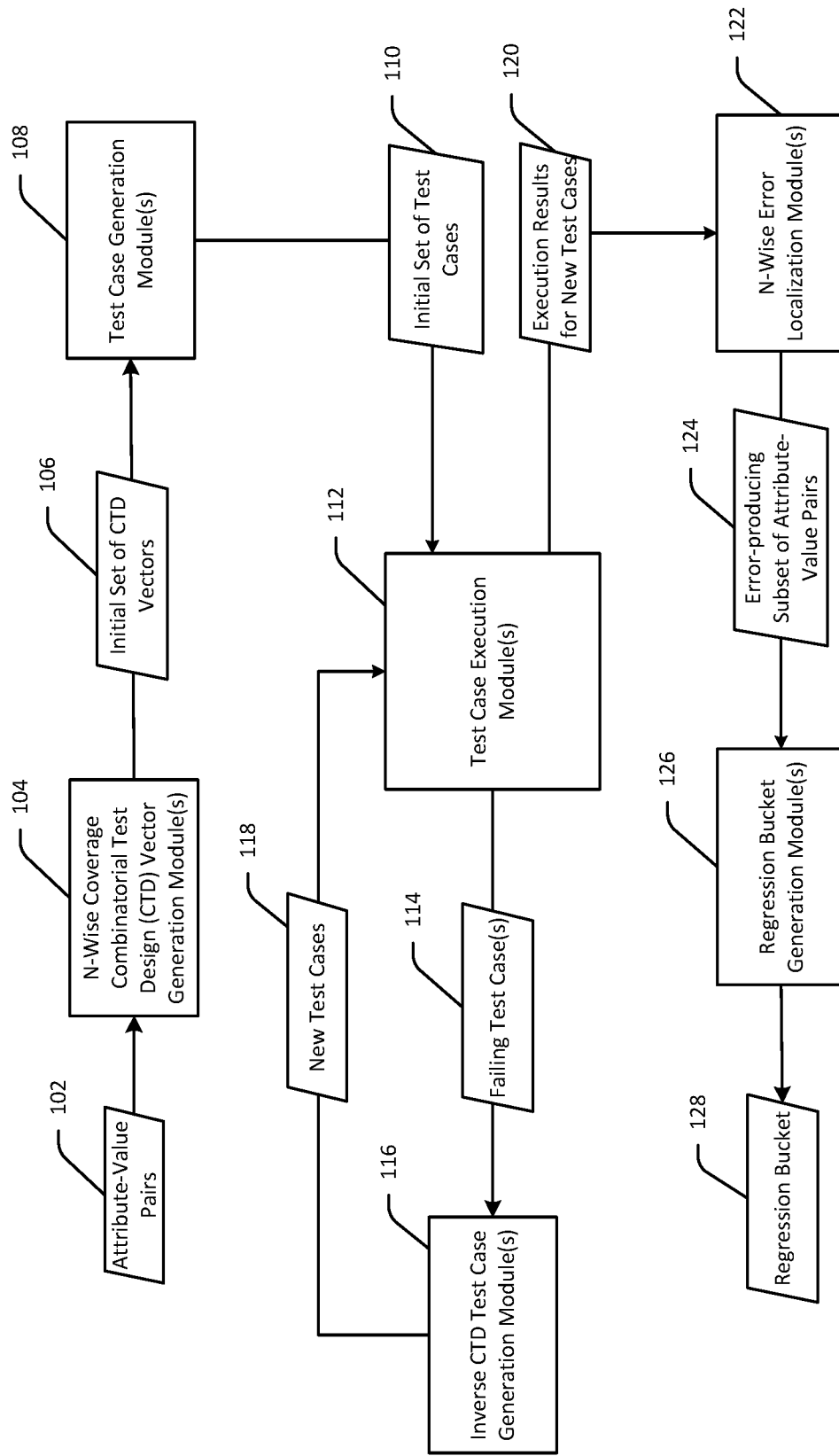
FIG. 1 is a schematic hybrid data flow/block diagram illustrating fault detection and localization using Combinatorial Test Design (CTD) techniques and generation of a regression bucket of failing test cases that expose a detected fault in accordance with one or more example embodiments of the invention.

Example embodiments of the invention relate to, among other things, devices, systems, methods, computer-readable media, techniques, and methodologies for performing fault detection and localization using Combinatorial Test Design (CTD) techniques and generating a regression bucket of test cases that expose the detected fault. In example embodiments, the detected and localized fault occurs in a System Under Test (SUT). The SUT may be a hardware system or a software system. Further, in example embodiments, the fault detection and localization may be performed while adhering to architectural restrictions on the SUT.

In example embodiments, inputs to a SUT are modeled as a collection of attribute-value pairs. More specifically, inputs to a SUT can be modeled as a collection of attributes, each of which can take on one or more corresponding attribute values. In example embodiments, the entire Cartesian product space that contains all possible combinations of attribute-value pairs can be reduced to a smaller set of test vectors that provides complete n-wise coverage of the entire test space. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of possible combinations of attribute-value pairs would be 4*3*3*2=72. Thus, in this illustrative example, the entire Cartesian product space would include 72 different combinations of attribute-value pairs. As previously noted, these 72 different combinations of attribute-value pairs can be reduced down to a smaller set of combinations that still provide complete n-wise coverage of the Cartesian product space. For instance, referring to the same example introduced above, if complete pairwise coverage is sought, then the 72 different combinations can be reduced down to 12 distinct combinations that together include every possible pairwise interaction of attribute values. The reduced number of combinations required to provide n-wise coverage may increase logarithmically as n increases.

In example embodiments, the entire Cartesian product space including all combinations of attribute-value pairs is reduced down to a smaller set of CTD test vectors that provides complete n-wise coverage for a desired n. In complex hardware or software systems, the total number of attributes and corresponding candidate attribute values may be quite large, in which case, the total number of possible combinations of attribute values making up the entire Cartesian product space may be astronomically large, making it practically infeasible to test all possible combinations. Reduction of the entire Cartesian product space down to a substantially smaller number of CTD test vectors that still provide complete n-wise coverage allows for any n-wise (or m-wise where m<n) fault to be detected without having to directly test every possible combination in the test space.

In example embodiments, a binary decision diagram or the like may be used to perform the reduction and identify the reduced set of CTD vectors that provides complete n-wise coverage. In example embodiments, each CTD test vector that is generated includes a unique combination of attribute values, and the set of CTD test vectors together include every possible n-wise interaction of attribute values. In particular, each CTD vector may have a dimension corresponding to the number of attributes that are modeled, where each element of the CTD vector is a respective attribute value for a corresponding attribute. The set of CTD vectors that is generated, however, may not be unique. That is, there may be multiple different sets of CTD vectors, each of which provides complete n-wise coverage. In example embodiments, the CTD vectors may be chosen at random while still ensuring complete n-wise coverage. In other example embodiments, the initial set of CTD vectors may be chosen with specific criteria in mind such as, for example, to increase or decrease the representation of particular attribute values within the set of CTD vectors.

In example embodiments, once the initial set of CTD test vectors are generated, they are used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector.

In example embodiments, the test cases are then executed. In example embodiments, execution of each test case results in either a successful execution result, indicating that the combination of attribute values associated with the test case does not contain an n-wise (or m-wise where m<n) error, or a failure execution result, indicating that the combination of attribute values associated with the test case do contain an n-wise (or m-wise where m<n) error. In example embodiments, a particular failing test case is then selected and inverse combinatorics is applied to the failing test case to produce a new set of test cases capable of exposing the bug. In example embodiments, application of inverse combinatorics to the selected failing test case includes generating a respective new test case with respect to each attribute. Thus, the number of new test cases generated may be equal to the number of attributes. In example embodiments, in each new test case, the attribute value of a corresponding attribute in the selected failing test case is changed to an attribute value for that attribute that is not present in any failing test case and the respective attribute value for each other attribute is unchanged from that which is present in the selected failing test case.

Those new test case(s) that yield a successful execution result may then be assessed to detect and localize the n-wise (or m-wise where m<n) error. In particular, the specific attribute-value pairs that cause the error may be identified based on those new test cases that successfully execute. A regression bucket of test cases may then be generated based on the error-producing combination of attribute-value pairs. More specifically, every possible combination of attribute values that include the attribute values determined to cause the error may be determined and a regression bucket of corresponding test cases for testing these combinations can be outputted for use by a manual tester, for example. In particular, in example embodiments, all test cases contained in the regression bucket will fail when executed until the bug is fixed, after which all regression bucket test cases should pass (i.e., produce a successful execution result).

In example embodiments, architectural restrictions may apply to the SUT. Architectural restrictions may include any of a variety of restrictions on inputs to the SUT. For instance, an example restriction may be that if a given attribute has a particular attribute value, then one or more other attributes are excluded from having certain attribute value(s). Another example architectural restriction may be that if a given attribute has a particular attribute value, then one or more other attributes must have certain attribute value(s). Yet another example architectural restriction may be that a new attribute is introduced if and only if a particular attribute has a particular attribute value. It should be appreciated that the above examples of architectural restrictions are merely illustrative and not exhaustive.

In example embodiments, architectural restrictions are taken into account prior to performing the reduction of the entire Cartesian space down to the initial set of CTD vectors that provides the desired complete n-wise coverage. That is, in example embodiments, particular combinations of attribute values that violate any architectural restrictions are first excluded from the Cartesian product space, and then the reduction down to the set of CTD vectors that provides complete desired n-wise coverage is performed. In this manner, it can be ensured that no combination of attribute values that violates an architectural restriction is included in the initial set of CTD vectors. Further, in example embodiments, when a selected test case corresponding to an initial CTD vector fails and is selected for expansion to obtain a set of new test cases designed to detect and localize an n-wise error, that expansion can be performed first without taking into account any architectural restrictions. Then, any new test cases that violate an architectural restriction can be excluded. In this manner, it can be ensured that the expansion provides as much coverage of the test space in the neighborhood around the failing test case as possible. In addition, in example embodiments, the regression bucket of failing test cases may first be generated without regards to architectural restrictions, and then any test cases that violate an architectural restriction can be excluded from the regression bucket. That is, test cases corresponding to all possible combinations in the entire Cartesian product test space that include the particular combination of attribute values causing an n-wise or lesser order error may first be generated and then reduced down to exclude any test case(s) that violate a restriction. Alternatively, the test cases included in the regression bucket may be selected from the reduced Cartesian space from which the initial set of CTD vectors are selected, in which case, the regression bucket would be generated to include only those combinations of attribute values that include the subset of attribute values causing the error and that do not violate any architectural restriction.

Example embodiments of the invention include various technical features that yield technical effects that provide various improvements to computer technology. For instance, example embodiments of the invention include the technical feature of inverse combinatorics to expand a set of test cases from a selected failing test case. This technical feature allows for an n-wise or lesser order fault to be detected and localized within a single iteration of the expansion. This technical effect represents an improvement to debugging and fault detection computer technology because it automates the creation of additional test cases around a selected failing test case in a manner that is specifically designed to facilitate detection and localization of a fault. Thus, the automated generation of new test cases in accordance with example embodiments of the invention is capable of exposing a fault more efficiently and using a fundamentally different methodology than manual test case generation. Example embodiments of the invention also include the technical feature of generating a regression bucket of test cases that tests every possible combination of attribute values that includes the particular subset of attribute values causing the n-wise fault. Thus, the regression bucket includes only test cases that would all fail prior to correction of the fault and that would all pass after correction of the fault. Thus, the automated generation of a regression bucket of failing test cases in accordance with example embodiments of the invention provides an improvement to computer technology by providing a tester or automated testing algorithm with a set of test cases—each of which is ensured to fail—such that the tester or automated testing algorithm can use the regression bucket of test cases to verify that a fault has been corrected when all test cases ultimately pass after debugging is performed.

Figure 4:
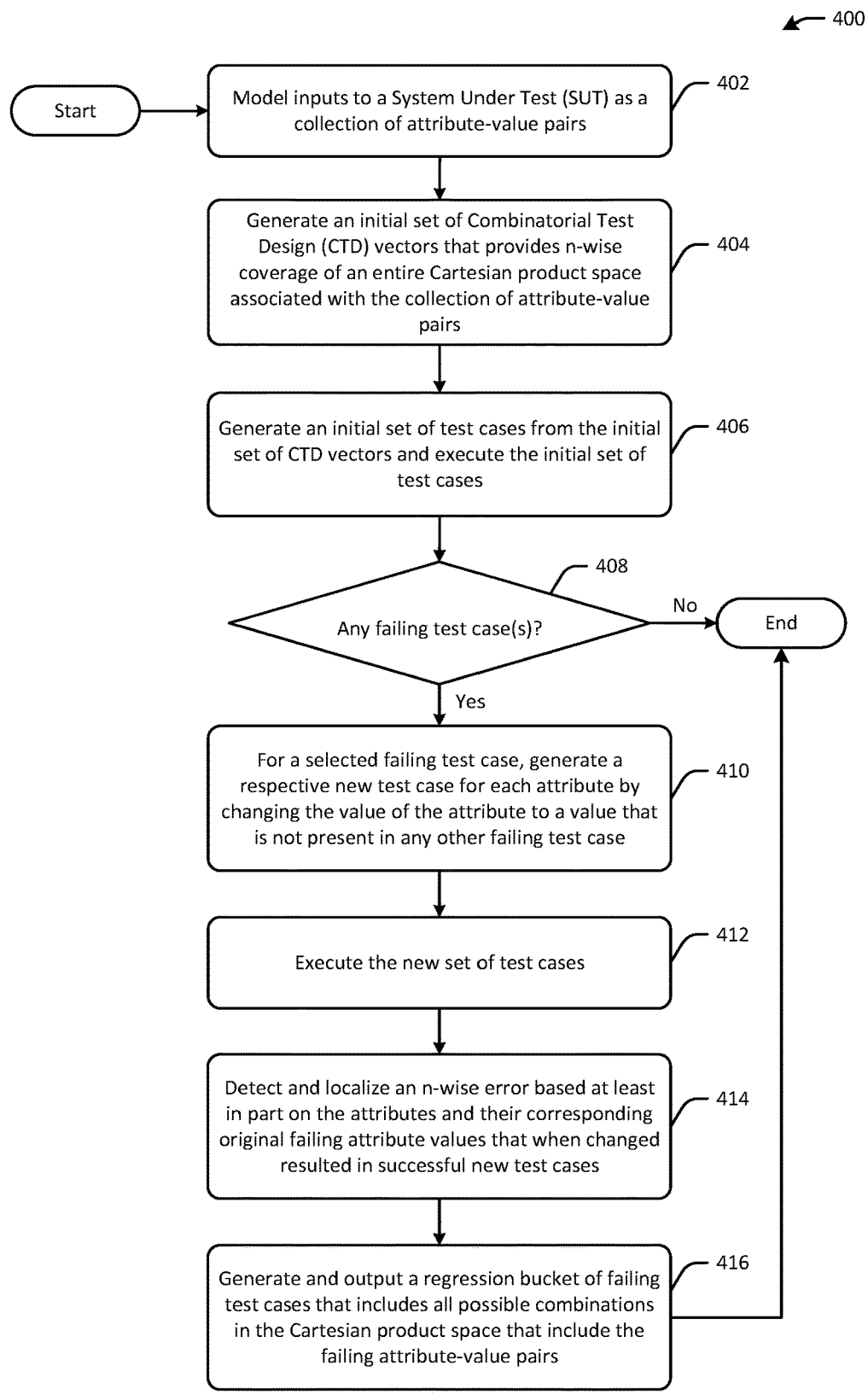
FIG. 4 is a process flow diagram of an illustrative method for detecting and localizing an n-wise fault using CTD techniques and generating a regression bucket of failing test cases that expose the detected n-wise fault in accordance with one or more example embodiments of the invention.

FIG. 1 is a schematic hybrid data flow/block diagram illustrating fault detection and localization using CTD techniques and generation of a regression bucket of failing test cases that expose a detected fault in accordance with one or more example embodiments of the invention. FIG. 4 is a process flow diagram of an illustrative method 400 for detecting and localizing an n-wise fault using CTD techniques and generating a regression bucket of failing test cases that expose the detected n-wise fault in accordance with one or more example embodiments of the invention. FIG. 4 will be described in conjunction with FIG. 1 hereinafter.

Illustrative methods in accordance with example embodiments of the invention and corresponding data structures (e.g., program modules) for performing the methods will now be described. It should be noted that each operation of the method 400 depicted in FIG. 4 and/or the method 500 depicted in FIG. 5 may be performed by one or more of the program modules or the like depicted in FIG. 1 or FIG. 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 4 in conjunction with FIG. 1, in example embodiments, at block 402 of the method 400, inputs to a SUT are modeled as a collection of attribute value pairs 102. Any number of attributes may be used to model SUT inputs and each attribute may take on any number of candidate attribute values. At block 404 of the method 400, in example embodiments, computer-executable instructions of one or more n-wise coverage CTD vector generation modules 104 are executed to generate an initial set of CTD vectors 106 that provides n-wise coverage of an entire Cartesian product space associated with the collection of attribute-value pairs 102.

Figure 3:
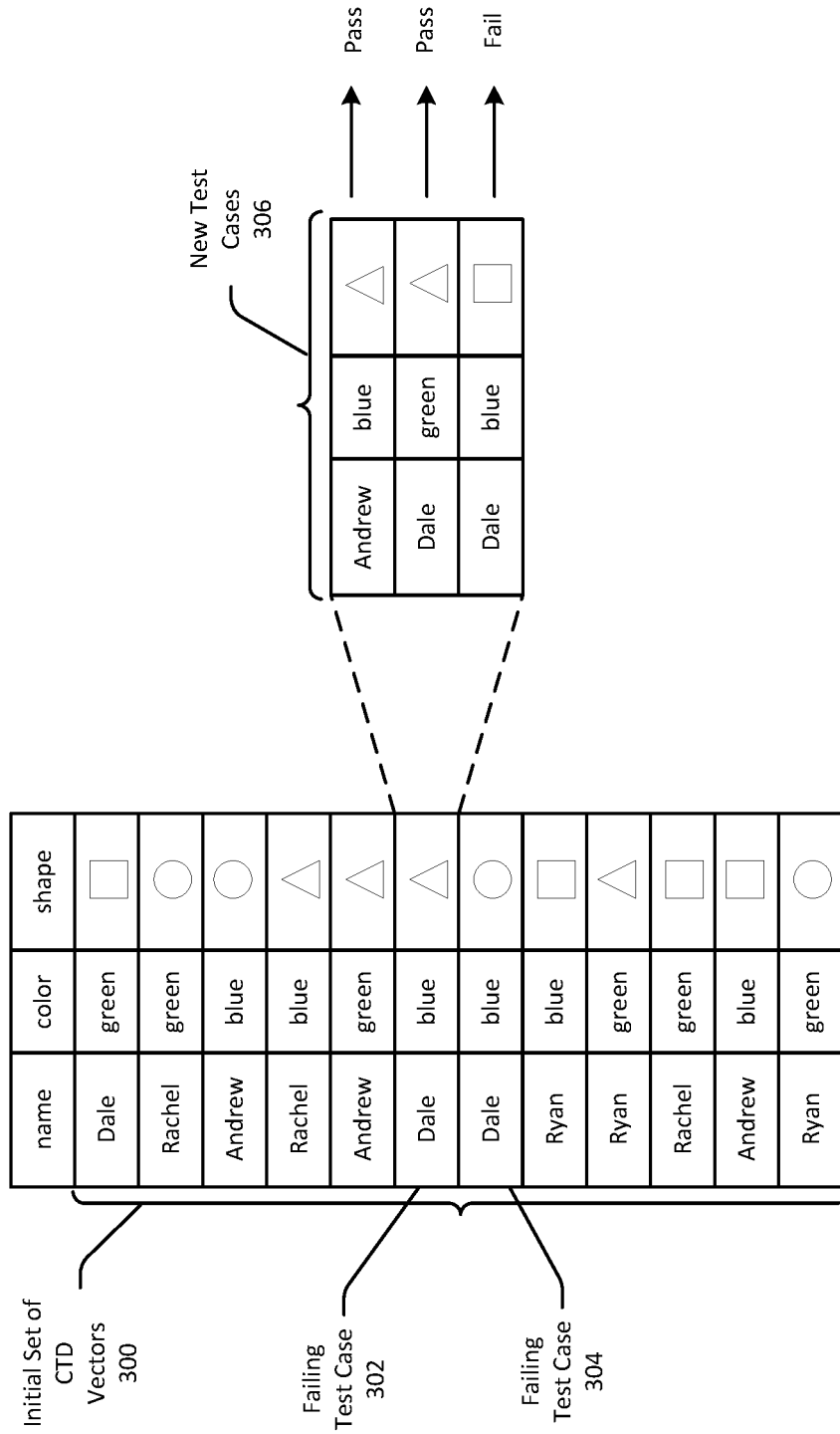
FIG. 3 is a schematic depiction of the expansion of new test cases from a selected failing test case using inverse combinatorics in accordance with one or more example embodiments of the invention.

In particular, the entire Cartesian product space that contains all possible combinations of the attribute-value pairs 102 is reduced to a smaller set of CTD test vectors 106 that provides complete n-wise coverage of the entire test space. In example embodiments, the complete n-wise coverage provided by the set of CTD vectors 106 may be complete pairwise coverage. For instance, if it is assumed that three attributes are modeled, namely, a "name" attribute, a "color" attribute, and a "shape" attribute as shown in FIG. 3, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs. In example embodiments, these 24 different combinations of attribute-value pairs are reduced down to a smaller set of combinations (i.e., the set of CTD vectors 106) that still provides complete n-wise coverage of the Cartesian product space. For instance, if complete pairwise coverage is sought, then the 24 different combinations can be reduced down to 12 distinct combinations that together include every possible pairwise interaction of attribute values. An example set of CTD vectors 300 is shown in FIG. 3. The example set of CTD vectors 300 includes all pairwise interactions between the attribute values of the attributes "name," "color," and "shape."

In example embodiments, a binary decision diagram or the like may be used to perform the reduction and identify the reduced set of CTD vectors 106 that provides complete n-wise coverage. While each CTD vector in the set of CTD vectors 106 includes a unique combination of attribute values, the set of CTD vectors 106 itself may not be unique. That is, there may be multiple different sets of CTD vectors, each of which provides complete n-wise coverage. For instance, while FIG. 3 depicts an example set of CTD vectors 300 for the example attributes and attribute values described, it should be appreciated that alternative sets of CTD vectors that include different combinations of attribute values may also independently provide complete n-wise coverage. It should further be appreciated that while the example set of CTD vectors 300 provides complete pairwise coverage and partial three-wise coverage, a greater number of CTD vectors would be needed to provide complete three-wise coverage. Stated more generally, as n increases, the number of CTD vectors needed to provide complete n-wise coverage increases logarithmically with n.

Figure 2:
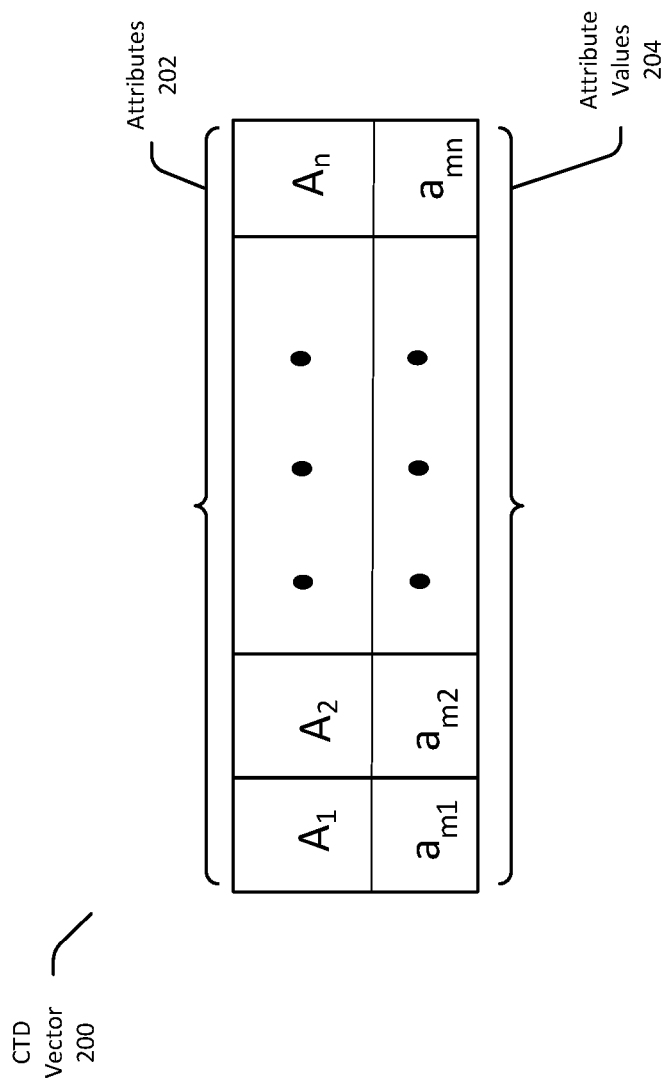
FIG. 2 is a schematic diagram of an example CTD vector in accordance with one or more example embodiments of the invention.

FIG. 2 depicts an example generic CTD vector 200 of the type that may be included in the set of CTD vectors 106. The example CTD vector 200 includes a plurality of attributes 202. As previously described, the attributes 202 may be used to model inputs to a SUT. The attributes 202 may be associated with attribute values 204. In particular, each attribute 202 may have a corresponding attribute value 204, which may be one of one or more candidate attribute values that the attribute is allowed to take on.

Referring again to FIG. 4, at block 406 of the method 400, in example embodiments, computer-executable instructions of one or more test case generation modules 108 may be executed to generate, from the initial set of CTD test vectors 106, a corresponding set of test cases 110, which are then executed by the test case execution module(s) 112 to yield an execution result (pass or fail) for each test case. For instance, the set of CTD test vectors 106 may be provided as input to a test case generation tool configured to generate a respective corresponding test case for each CTD vector. Each test case in the set of test cases 110 may be designed to test the interactions among the particular combination of attribute values contained in a corresponding CTD vector of the set of CTD vectors 106. It should be appreciated that a set of CTD vectors and their corresponding test cases may, at times herein, be described and/or depicted interchangeably. For instance, the example set of CTD vectors 300 depicted in FIG. 3 may be interchangeably thought of as the corresponding set of test cases that test the particular combinations of attribute values represented by the set of CTD vectors 300.

At block 408 of the method 400, in example embodiments, computer-executable instructions of the test case execution module(s) 112 are executed to determine whether any test cases in the set of test cases 110 failed. In example embodiments, execution of each test case 110 results in either a successful execution result, indicating that the combination of attribute values contained in the corresponding CTD vector 106 does not contain an n-wise (or m-wise where m<n) error, or a failure execution result, indicating that the combination of attribute values in the corresponding CTD vector 106 does contain an n-wise (or m-wise where m<n) error.

Referring to the example depicted in FIG. 3, test cases corresponding to the example set of CTD vectors 300 are executed at block 406 in example embodiments to yield a respective execution result for each test case. In particular, two test cases 302 and 304 are illustratively depicted in FIG. 3 as resulting in failure. Failing test case 302 tests the following combination of attribute values: Dale; blue; triangle, which respectively correspond to the attributes name, color, and shape. Failing test case 304 tests the following combination of attribute values: Dale; blue; circle, which respectively correspond to the attributes name, color, and shape. Although "Dale" and "blue" are present both in the CTD vector corresponding to failing test case 302 and in the CTD vector corresponding to failing test case 304, it is unclear at this stage in the process as to whether "Dale" and "blue" are generating a pairwise error; whether "Dale" and ("triangle" or "circle") are generating the pairwise errors; or whether "blue" and "triangle" or "circle") are generating the pairwise errors. Subsequent operations of method 400, as will be described hereinafter, utilize inverse combinatorics to expand the test space around a selected failing test case to detect and localize the particular combination of attribute values that are causing the n-wise error (pairwise error in the case of the example depicted in FIG. 3).

Referring again to FIG. 4, responsive to a negative determination at block 408, the method 400 may end because none of the initial set of test cases 110 has failed. Because the initial set of CTD vectors 106 (based on which the set of test cases 110 were generated) provided complete n-wise coverage, it can be ensured that an n-wise or lesser order error is not present. However, successful execution of all of the test cases in the initial set of test cases 110 does not ensure that a higher order error (k-wise where k>n) is not present.

On the other hand, in response to a positive determination at block 408 indicating that execution of the set of test cases 110 results in one or more failing test cases 114, the method proceeds to block 410 where, in example embodiments, computer-executable instructions of one or more inverse CTD test case generation modules 116 are executed to select a particular failing test case 114 and apply inverse combinatorics to the selected failing test case 114 to produce a new set of test cases 118 capable of being used to detect and localize the combination of attribute values that are causing the n-wise or lesser order error.

In example embodiments, application of inverse combinatorics to the selected failing test case 114 includes generating a respective new test case 118 with respect to each attribute. Thus, the number of new test cases generated may be equal to the number of attributes. In example embodiments, in each new test case 118, the attribute value in the selected failing test case 114 of a corresponding attribute is changed to an attribute value for that attribute that is not present in any other failing test case and the respective attribute value for each other attribute is unchanged from that which is present in the selected failing test case 114.

Referring again to the example depicted in FIG. 3, assuming that failing test case 302 is selected at block 410, then the example set of new test cases 306 may be generated. In example embodiments, each example new test case 306 may be generated by changing the attribute value of a corresponding attribute in the selected failing test case 302 to a different value that is not present in any other failing test case. For instance, a first new test case corresponding to the CTD vector <Andrew, blue, triangle> is obtained by changing the attribute value of the "name" attribute in the failing test case 302 from "Dale" to "Andrew" while keeping the attribute values for the other attributes the same as in the failing test case 302. Similarly, a second new test case corresponding to the CTD vector <Dale, green, triangle> is obtained by changing the attribute value of the "color" attribute in the failing test case 302 from "Blue" to "Green" while keeping the attribute values for the other attributes the same as in the failing test case 302. Lastly, a third new test case corresponding to the CTD vector <Dale, blue, square> is obtained by changing the attribute value of the "shape" attribute in the failing test case 302 from "triangle" to "square" while keeping the attribute values for the other attributes the same as in the failing test case 302.

It should be appreciated that the respective attribute value that is changed to obtain each new test case 306 is obviously not present in the selected failing test case 302. Moreover, each changed attribute value is not present in any other failing test case as well (e.g., failing test case 304). Specifically, the changed attribute value "Andrew" for the first new test case is not present in any failing test case; the changed attribute value "green" for the second new test case is not present in any failing test case; and the changed attribute value "square" for the third new test case is not present in any failing test case.

After generating the set of new test cases 118 by performing inverse combinatorics on a selected failing test case 114, computer-executable instructions of the test case execution module(s) 112 are executed, in example embodiments, at block 412 of the method 400. Then, at block 414 of the method 400, in example embodiments, computer-executable instructions of one or more n-wise error localization modules 122 are executed to detect and localize an n-wise or lesser order error based on the attributes and their corresponding original failing attribute values in the selected failing test case 114 that when changed resulted in new test cases that pass. In particular, computer-executable instructions of the n-wise error localization module(s) 122 are executed to assess execution results 120 for the set of new test cases 118 to detect and localize an n-wise or lesser order error based on those new test cases that yield a successful execution result. As used herein, a lesser order error refers to an m-wise error where m<n, assuming complete n-wise coverage by the set of CTD vectors 106.

Referring again to the example depicted in FIG. 3 which assumes detection and localization of a pairwise error, execution of the set of new test cases 306 results in the first new test case corresponding to the CTD vector <Andrew, blue, triangle> passing; the second new test case corresponding to the CTD vector <Dale, green, triangle> passing; and the third new test case corresponding the CTD vector <Dale, blue, square> failing. In example embodiments, the n-wise error localization module(s) 122 determine, based on the failing execution result for the third new test case, that the "shape" attribute is not contributing to a pairwise error because changing the attribute value from "triangle" in the failing test 302 to "square" in the third new test case continues to result in failure.

On the other hand, the n-wise error localization module(s) 122 may determine that the attributes whose attribute values were changed to obtain the new test cases that passed execution do contribute to the pairwise error. Specifically, in example embodiments, based on the successful execution result for the first new test case corresponding to the CTD vector <Andrew, blue, triangle>, the n-wise error localization module(s) 122 determine that the "name" attribute and the original failing attribute value "Dale" are contributing to the pairwise error. Similarly, in example embodiments, based on the successful execution result for the second new test case corresponding to the CTD vector <Dale, green, triangle>, the n-wise error localization module(s) 122 determine that the "color" attribute and the original failing attribute value "blue" are also contributing to the pairwise error. Thus, based on the execution results 120 for the set of new test cases 118, the n-wise error localization module(s) 122 are capable of determining, in the example depicted in FIG. 3, that the attributes "name" and "color" having the attribute values "Dale" and "blue," respectively, are responsible for the pairwise error. Stated more generally, the n-wise error localization module(s) 122 are capable of determining the specific attribute-value pairs that cause an n-wise or lesser order error based on an assessment of the execution results 120 for the set of new cases 118, and more specifically, the original attribute values that were changed in the selected failing test case to obtain passing new test cases.

The example depicted in FIG. 3 assumes an initial set of CTD vectors 300 that provides complete pairwise coverage, in which case, a pairwise or lesser order error (e.g., a single attribute value that causes an error) can be detected and localized in a single pass of applying inverse combinatorics on a selected failing test case to obtain the set of new test cases 118. In general, if the initial set of CTD vectors 106 provides n-wise coverage, then a single pass of applying inverse combinatorics on a selected failing test case reveals an n-wise or lesser order error. While a k-wise error where k>n may be detectable using an initial set of CTD vectors that provides complete n-wise coverage, this is not a guarantee because the initial set of CTD vectors 106 would not include all k-wise interactions. However, an initial set of CTD vectors 106 that provides complete n-wise coverage (e.g., complete pairwise coverage) may provide some degree of k-wise coverage where k>n (e.g., three-wise coverage), and thus, based on the particular CTD vectors that are chosen, the method 400 may be capable of revealing a k-wise error at a single pass or after multiple passes of applying inverse combinatorics to selected failing test cases.

Referring again to FIG. 4, at block 416 of the method 400, in example embodiments, computer-executable instructions of one or more regression bucket generation module(s) 126 are executed to generate and output a regression bucket 128 of failing test cases that includes all possible combinations in the Cartesian product space that include the original failing attribute-value pairs. In particular, the regression bucket generation module(s) 126, in example embodiments, receive an indication of the error-producing subset of attribute-value pairs 124 as input and determine and output the regression bucket 128 that includes only those test cases that correspond to all possible combinations in the Cartesian product space that include the particular attribute values that are causing the detected error.

Referring again to the example of FIG. 3, the regression bucket generation module(s) 126 receive as input the attributes "name" and "color" and the corresponding attribute values "Dale" and "blue" that are causing the pairwise error, determines all attribute-value combinations in the Cartesian product space that include "Dale" and "blue," and populates the regression bucket 128 with test cases corresponding to all of these combinations. In this example, the regression bucket 128 would include the following test cases: (Dale, blue, triangle); (Dale, blue, circle); and (Dale, blue, square). Because each of the test cases in the regression bucket 128 includes the attribute values "Dale" and "blue" for the attributes "name" and "color," respectively, which together are contributing to the detected pairwise error, each test case in the regression bucket 128 is ensured to fail. In example embodiments, the regression bucket 128 can be outputted for use by a manual tester or another automated debugging algorithm. The regression bucket 128 of failing test cases can be used to verify whether the detected error has been corrected because all test cases contained in the regression bucket 128 will pass only when the bug is fixed. Thus, if any test case in the regression bucket 128 continues to fail despite modifications made to the SUT in an attempt to correct the error, then this indicates that the error has not been completely resolved.

Figure 5:
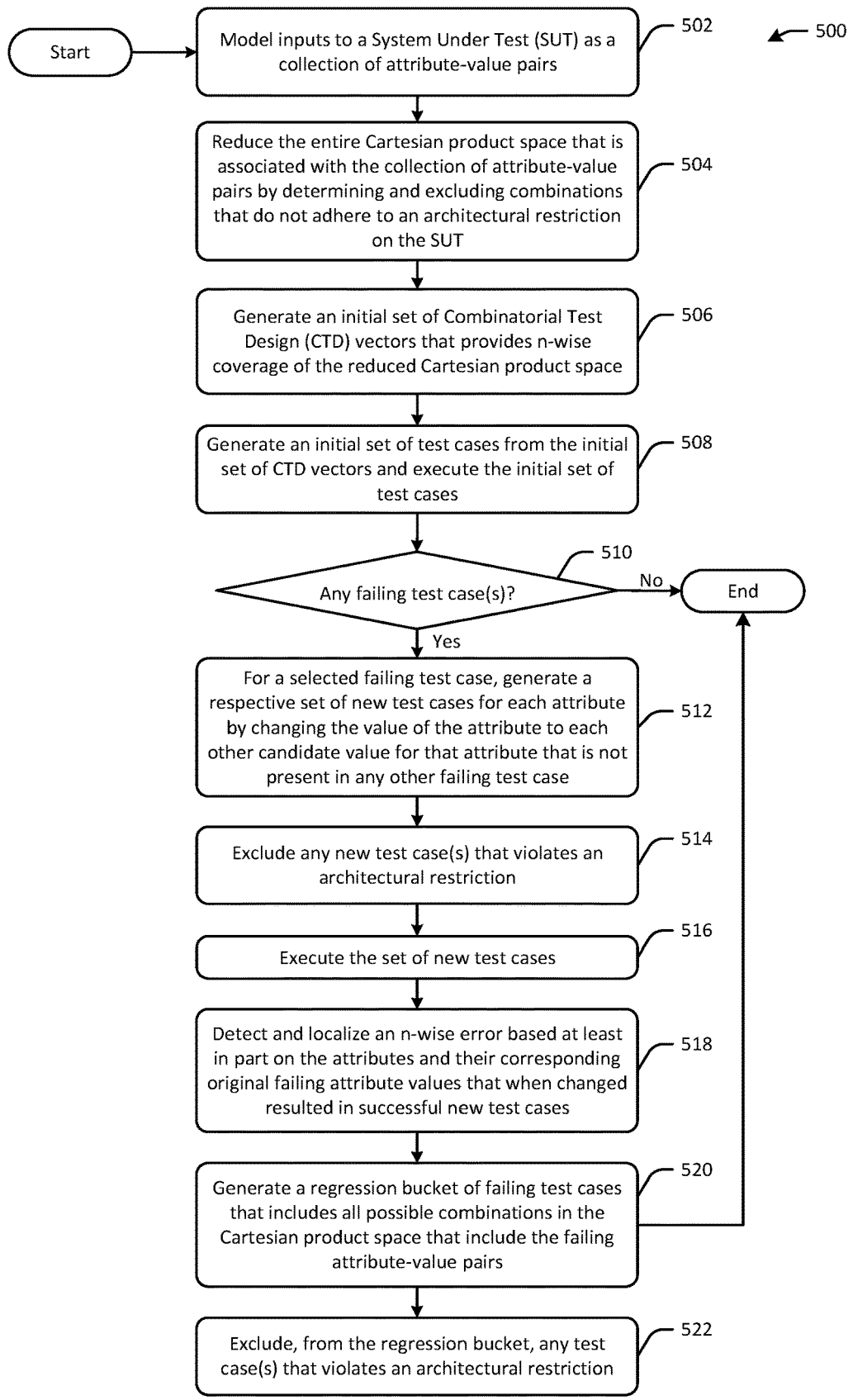
FIG. 5 is a process flow diagram of an illustrative method for detecting and localizing an n-wise fault using CTD techniques and generating a regression bucket of test cases that expose the detected n-wise fault while adhering to architectural restrictions in accordance with one or more example embodiments of the invention.

FIG. 5 is a process flow diagram of an illustrative method 500 for detecting and localizing an n-wise fault using CTD techniques and generating a regression bucket of failing test cases that expose the detected n-wise fault while adhering to architectural restrictions in accordance with one or more example embodiments of the invention. FIG. 5 will be described in conjunction with FIG. 1 hereinafter.

At block 502 of the method 500, inputs to a SUT may be modeled as a collection of attribute-value pairs 102 similar to block 402 of the method 400. Then, at block 504 of the method 500, in example embodiments, computer-executable instructions of the n-wise coverage CTD vector generation module(s) 104 are executed to reduce the entire Cartesian product space associated with the collection of attribute-value pairs 102 down by identifying and excluding those combinations that do not adhere to architectural restrictions associated with the SUT. After the entire Cartesian product space is reduced to exclude combinations that do not satisfy architectural restrictions on the SUT, computer-executable instructions of the n-wise coverage CTD vector generation module(s) 104 are executed, in example embodiments, at block 506 of the method 500, to generate the further reduced initial set of CTD vectors 106. In example embodiments, each CTD vector 106 is selected only from the reduced test space that excludes invalid combinations of attribute values that violate architectural restrictions on the SUT.

Architectural restrictions may include any of a variety of restrictions on inputs to the SUT. For instance, an example restriction may be that if a given attribute has a particular attribute value, then one or more other attributes are excluded from having certain attribute value(s). Another example architectural restriction may be that if a given attribute has a particular attribute value, then one or more other attributes must have certain attribute value(s). Yet another example architectural restriction may be that a new attribute is introduced if and only if a particular attribute has a particular attribute value. It should be appreciated that the above examples of architectural restrictions are merely illustrative and not exhaustive.

In example embodiments, architectural restrictions are taken into account in method 500 prior to performing the reduction of the entire Cartesian space down to the initial set of CTD vectors 106 that provides desired complete n-wise coverage. That is, in example embodiments, particular combinations of attribute values that violate any architectural restrictions are first excluded from the Cartesian product space, and then the reduction down to the set of CTD vectors 106 that provides complete desired n-wise coverage is performed. In this manner, it can be ensured that no combination of attribute values that violates an architectural restriction is included in the initial set of CTD vectors 106.

At block 508 of the method 500, the initial set of test cases 110 is generated from the initial set of CTD vectors 106 and executed similar to block 406 of the method 400. At block 510, a determination is made as to whether any of test cases 110 failed similar to the determination at block 408 of the method 400. In response to a negative determination at block 510, the method 500 ends because none of test cases 110 produce a failing execution result. On the other hand, in response to a positive determination at block 510, the method 500 proceeds to block 512, where computer-executable instructions of the inverse CTD test case generation module(s) 116 are executed to generate new test cases 118 from a selected failing test case.

In example embodiments, a respective set of new test cases is generated for each attribute by changing the attribute value for that attribute in the selected failing test case to each other candidate attribute value for that attribute that is not present in any of the failing test cases. Thus, the example method 500 differs from the example method 400 with respect to the manner in which the new test cases 118 are generated. In particular, according to the example method 400, a single new test case is generated with respect to each attribute in a selected failing test case by changing the attribute value for the attribute to another attribute value that the attribute is eligible to have and that is not present in any failing test case. While there may be multiple attribute values for an attribute that are not present in any failing test case, each new test case generated according to the example method 400 only needs to test one such attribute value, and thus, each new test case can be generated simply by oscillating a corresponding attribute value in the selected failing test case to one other attribute value that is not present in any failing test case. In contrast, according to the example method 500, for each attribute in a selected failing test case, a new test case is generated for each possible attribute value for that attribute that is not present in any failing test case. Thus, according to the example method 500, if there are multiple attribute values for an attribute that are not present in any failing test case, a new test case is generated for each such attribute value.

For instance, if we assume that 1) there are three attributes A, B, and C that can take on the candidate attribute values $A_1$-$A_4$, $B_1$-$B_3$, and $C_1$-$C_3$, respectively, 2) the selected failing test case tests the following combination of attribute values: ($A_1$, $B_1$, $C_1$), and 3) there is one other failing test case that tests the following combination of attribute values ($A_2$, $B_1$, $C_3$), then according to the example method 400, the following set of new test cases may be generated: {($A_3$, $B_1$, $C_1$); ($A_1$, $B_2$, $C_1$); ($A_1$, $B_1$, $C_2$)}. Because, the example method 400 generates only a single new test case with respect to each attribute in the selected failing test case, alternate sets of new test cases can also be generated in example embodiments. For instance, the example method 400 may generate either of the following sets of new test cases in lieu of the one described above: $\{(A_4, B_1, C_1); (A_1, B_2, C_1); (A_1, B_1, C_2)\}$ or $\{(A_4, B_1, C_1); (A_1, B_3, C_1); (A_1, B_1, C_2)\}$. In contrast, according to the example method 500, all of the unique new test cases described above would be generated because a new test case is generated with respect to each attribute for each attribute value for that attribute that is not present in any failing test case. That is, the set of new test cases generated according to the example method 500 would include $\{(A_3, B_1, C_1); (A_1, B_2, C_1); (A_4, B_1, C_2); (A_4, B_1, C_1); (A_1, B_3, C_1)\}$. Thus, the inverse combinatorics expansion performed according to the example method 500 may generally result in a larger set of new test cases then the example method 400.

In the example depicted in FIG. 3, for instance, inverse combinatorics are applied to the failing test case 302 to obtain the set of new test cases 306 according to the example method 400. That is, a single new test case is shown as being generated with respect to each attribute in the selected failing test case 302 by changing the corresponding attribute value for that attribute in the selected failing test case 302 to another candidate attribute value that is not present in any failing test case. If, on the other hand, the set of new test cases 306 was generated according to the example method 500 instead, the set 306 would include the following additional test cases: (Ryan, blue, triangle) and (Rachel, blue, triangle) because the attribute values "Ryan" and "Rachel" are also not present in any failing test case.

After the inverse combinatorics expansion is performed at block 512, the method 500 may proceed to block 514, where computer-executable instructions of the inverse CTD test case generation module(s) 116 may be executed to exclude any test case generated at block 512 that violates an architectural restriction on the SUT. Thus, in example embodiments, the set of new test cases 118 obtained via the inverse combinatorics expansion at block 512 is reduced to a smaller set by excluding (and not executing) one or more new test cases that violate one or more architectural restrictions. In particular, when a selected test case corresponding to an initial CTD vector 106 fails and is selected for expansion to obtain the set of new test cases 118 designed to detect and localize an n-wise error, the expansion may be performed first without taking into account any architectural restrictions. Then, any new test cases generated from the expansion that violate an architectural restriction can be excluded from the set of new test cases 118. In this manner, it can be ensured that the expansion provides as much coverage of the test space in the neighborhood around the failing test case as possible.

At block 516 of the method 500, the set of new test cases 118 (potentially reduced at block 514 to exclude any test case generated via the inverse combinatorics expansion at block 512 that violates an architectural restriction) may be executed similar to block 412 of the method 400. At block 518 of the method 500, in example embodiments, an n-wise error is detected and localized based at least in part on the attributes and their corresponding attribute values in the selected failing test case that when changed produce a new test case that passes, similar to block 414 of the method 400.

Then, at block 520 of the method 500, the regression bucket 128 of failing test cases is generated similar to block 416 of the method 400. Each test case in the regression bucket 128 corresponds to a particular combination of attribute values that includes the failure-producing subset of attribute values 124 such that the regression bucket 128 covers all possible combinations of attribute-value pairs that adhere to architectural restrictions on the SUT and that include the failure-producing attribute values. Finally, at block 522 of the method 500, any failing test case that violates an architectural restriction can be excluded from the regression bucket 128. Thus, according to the example method 500, the regression bucket 128 of failing test cases may first be generated without regards to architectural restrictions, and then any test case that violates an architectural restriction can be excluded from the regression bucket 128. That is, test cases corresponding to all possible combinations in the entire Cartesian product test space that include the particular combination of attribute values causing an n-wise or lesser order error may first be generated and included in the regression bucket 128, and then the regression bucket 128 may be reduced to exclude any test case(s) that violate a restriction. In alternative example embodiments, the test cases included in the regression bucket 128 may be selected from the reduced Cartesian space from which the initial set of CTD vectors are selected, in which case, the regression bucket 128 would be generated to include only those combinations of attribute values that include the subset of attribute values causing the error and that do not violate any architectural restriction.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 6:
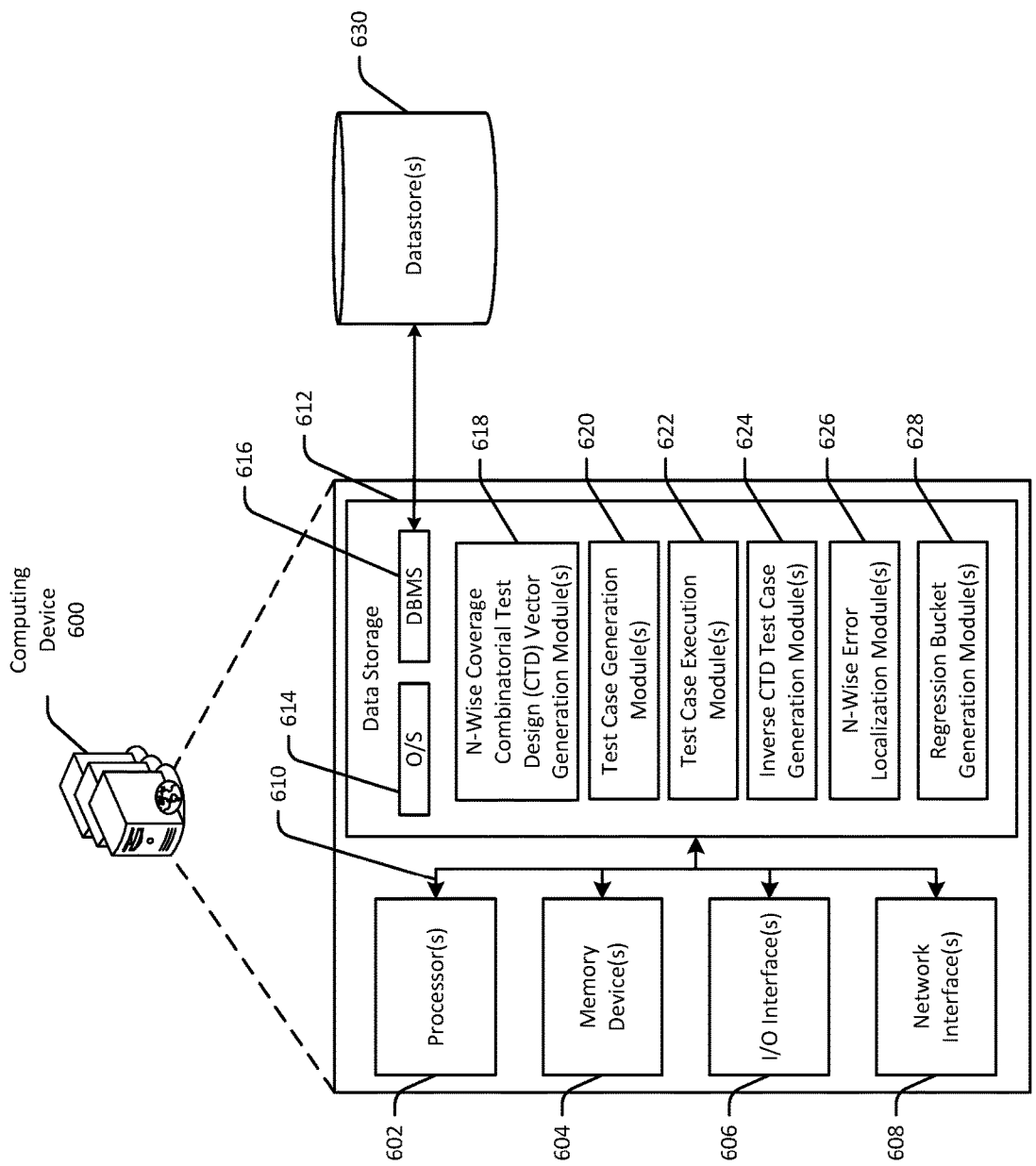
FIG. 6 is a schematic diagram of an illustrative computing device configured to implement one or more example embodiments of the invention.

FIG. 6 is a schematic diagram of an illustrative computing device 600 configured to implement one or more example embodiments of the invention. The illustrative computing device 600 may include a server or collection of servers; a personal computer; a handheld device; or the like. While the computing device 600 and/or any particular component of the computing device 600 may be described herein in the singular, it should be appreciated that multiple instances of the computing device 600 and/or any component thereof may be provided and functionality described in connection with the computing device 600 may be distributed across multiple computing devices 600 and/or across multiple instances of any particular component of the computing device 600.

In an illustrative configuration, the computing device 600 may include one or more processors (processor(s)) 602, one or more memory devices 604 (generically referred to herein as memory 604), one or more input/output ("I/O") interfaces 606, one or more network interfaces 608, and data storage 612. The computing device 600 may further include one or more buses 610 that functionally couple various components of the computing device 600.

The bus(es) 610 may include at least one of a system bus, a memory bus, an address bus, or a message bus, and may permit the exchange of information (e.g., data (including computer-executable code), signaling, etc.) between various components of the computing device 600. The bus(es) 610 may include, without limitation, a memory bus or a memory controller, a peripheral bus, an accelerated graphics port, and so forth. The bus(es) 610 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 612 may include removable storage and/or non-removable storage including, but not limited to, magnetic storage, optical disk storage, and/or tape storage. The data storage 612 may provide non-volatile storage of computer-executable instructions and other data. The memory 604 and the data storage 612, removable and/or non-removable, are examples of computer-readable storage media (CRSM) as that term is used herein.

The data storage 612 may store computer-executable code, instructions, or the like that may be loadable into the memory 604 and executable by the processor(s) 602 to cause the processor(s) 602 to perform or initiate various operations. The data storage 612 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 612 for non-volatile storage.

More specifically, the data storage 612 may store one or more operating systems (O/S) 614; one or more database management systems (DBMS) 616 configured to access the memory 604 and/or one or more external datastores 630; and one or more program modules, applications, engines, managers, computer-executable code, scripts, or the like such as, for example, one or more n-wise coverage CTD vector generation modules 618; one or more test case generation modules 620; one or more test case execution modules 622; one or more inverse CTD test case generation modules 624; one or more n-wise error localization modules 626; and one or more regression bucket generation modules 628. Any of the components depicted as being stored in data storage 612 may include any combination of software, firmware, and/or hardware. The software and/or firmware may include computer-executable instructions (e.g., computer-executable program code) that may be loaded into the memory 604 for execution by one or more of the processor(s) 602 to perform any of the operations described earlier in connection with correspondingly named modules/engines.

Although not depicted in FIG. 6, the data storage 612 may further store various types of data utilized by components of the computing device 600 (e.g., data stored in the datastore(s) 630). Any data stored in the data storage 612 may be loaded into the memory 604 for use by the processor(s) 602 in executing computer-executable instructions. In addition, any data stored in the data storage 612 may potentially be stored in the external datastore(s) 630 and may be accessed via the DBMS 616 and loaded in the memory 604 for use by the processor(s) 602 in executing computer-executable instructions.

The processor(s) 602 may be configured to access the memory 604 and execute computer-executable instructions loaded therein. For example, the processor(s) 602 may be configured to execute computer-executable instructions of the various program modules, applications, engines, managers, or the like of the computing device 600 to cause or facilitate various operations to be performed in accordance with one or more embodiments of the invention. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 612, the O/S 614 may be loaded from the data storage 612 into the memory 604 and may provide an interface between other application software executing on the computing device 600 and hardware resources of the computing device 600. More specifically, the O/S 614 may include a set of computer-executable instructions for managing hardware resources of the computing device 600 and for providing common services to other application programs. In certain example embodiments, the O/S 614 may include or otherwise control the execution of one or more of the program modules, engines, managers, or the like depicted as being stored in the data storage 612. The O/S 614 may include any operating system now known or which may be developed in the future including, but not limited to, any server operating system, any mainframe operating system, or any other proprietary or non-proprietary operating system.

The DBMS 616 may be loaded into the memory 604 and may support functionality for accessing, retrieving, storing, and/or manipulating data stored in the memory 604, data stored in the data storage 612, and/or data stored in external datastore(s) 630. The DBMS 616 may use any of a variety of database models (e.g., relational model, object model, etc.) and may support any of a variety of query languages. The DBMS 616 may access data represented in one or more data schemas and stored in any suitable data repository. Data stored in the datastore(s) 630 may include, for example, architectural restrictions data 130; CTD vectors; CTD test case results; and so forth, any portion of which may alternatively or additionally be stored in the data storage 612. External datastore(s) 630 that may be accessible by the computing device 600 via the DBMS 616 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 600 may further include one or more network interfaces 608 via which the computing device 600 may communicate with any of a variety of other systems, platforms, networks, devices, and so forth. The network interface(s) 608 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 6 as being stored in the data storage 612 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 600 and/or other computing devices may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 600 may include alternate and/or additional hardware, software, or firmware components beyond those described or depicted without departing from the scope of the invention. More particularly, it should be appreciated that software, firmware, or hardware components depicted as forming part of the computing device 600 are merely illustrative and that some components may not be present or additional components may be provided in various embodiments. While various illustrative modules have been depicted and described as software modules stored in data storage 612, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 400 and/or the method 500 may be performed by one or more computing devices 600 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative methods of FIGS. 4 and 5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 4 and 5 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting and localizing a fault in a System Under Test (SUT), the method comprising:
    modeling inputs to the SUT as a collection of attribute-value pairs;
    generating an initial set of test vectors that provides complete n-wise coverage of a test space associated with the collection of attribute-value pairs;
    generating an initial set of test cases from the initial set of test vectors;
    executing the initial set of test cases to obtain a first set of execution results;
    determining, based at least in part on the first set of execution results, that one or more test cases failed execution;
    selecting, from the one or more test cases that failed execution, a failing test case to identify a cause of failure, the failing test case tests a first attribute with a first value;
    generating a set of new test cases from the selected failing test case, wherein generating the set of new test cases comprises changing the first value of the first attribute in the selected failing test case to a respective value in each new test case that is generated;
    executing the set of new test cases to obtain a second set of execution results; and
    detecting and localizing the fault based at least in part on the second set of execution results.

2. The method of claim 1, wherein changing the respective value in the selected failing test case to generate each new test case comprises changing the respective value to an attribute value that is not present in any of the one or more test cases that failed execution.

3. The method of claim 1, wherein detecting and localizing the fault based at least in part on the second set of execution results comprises:
    determining that a particular new test case failed execution; and
    determining that the attribute having the first value in the selected failing test case that was changed to obtain the particular new test case does not contribute to the fault.

4. The method of claim 1, wherein detecting and localizing the fault based at least in part on the second set of execution results comprises:
    determining that a first new test case and a second new test case each successfully executed;
    determining a second attribute having a second original attribute value in the selected failing test case that was changed to generate the second new test case; and
    determining that the first value and the second original attribute value contribute to the fault.

5. The method of claim 4, wherein the initial set of test vectors provides complete pairwise coverage of the test space, wherein the fault is a pairwise error in the SUT, and wherein determining that the first original attribute value and the second original attribute value contribute to the fault comprises determining that the first original attribute value and the second original attribute value cause the pairwise error.

6. The method of claim 1, wherein detecting and localizing the fault based at least in part on the second set of execution results comprises determining a particular combination of attribute values that causes the fault.

7. The method of claim 6, further comprising:
    generating a regression bucket of failing test cases based at least in part on the particular combination of attribute values that causes the fault, wherein the regression bucket covers all possible combinations of the collection of attribute-value pairs that include the particular combination of attribute values that causes the fault.

8. A system for detecting and localizing a fault in a System Under Test (SUT), the system comprising:
    at least one processor; and
    at least one memory storing computer-executable instructions, wherein the at least one processor is configured to access the at least one memory and execute the computer-executable instructions to:
        model inputs to the SUT as a collection of attribute-value pairs;
        generate an initial set of test vectors that provides complete n-wise coverage of a test space associated with the collection of attribute-value pairs;
        generate an initial set of test cases from the initial set of test vectors;
        execute the initial set of test cases to obtain a first set of execution results;
        determine, based at least in part on the first set of execution results, that one or more test cases failed execution;
        select, from the one or more test cases that failed execution, a failing test case to identify a cause of failure, the failing test case tests a first attribute with a first value;
        generate a set of new test cases from the selected failing test case, wherein generating the set of new test cases comprises changing the first value of the first attribute in the selected failing test case to a respective value in each new test case that is generated;
        execute the set of new test cases to obtain a second set of execution results; and
        detect and localize the fault based at least in part on the second set of execution results.

9. The system of claim 8, wherein the at least one processor is configured to change the respective value in the selected failing test case to generate each new test case by executing the computer-executable instructions to change the respective value to an attribute value that is not present in any of the one or more test cases that failed execution.

10. The system of claim 8, wherein the at least one processor is configured to detect and localize the fault based at least in part on the second set of execution results by executing the computer-executable instructions to:

determine that a particular new test case failed execution; and determine that the attribute having the first value in the selected failing test case that was changed to obtain the particular new test case does not contribute to the fault.

11. The system of claim 8, wherein the at least one processor is configured to detect and localize the fault based at least in part on the second set of execution results by executing the computer-executable instructions to:

determine that a first new test case and a second new test case each successfully executed;

determine a second attribute having a second original attribute value in the selected failing test case that was changed to generate the second new test case; and determine that the first value and the second original attribute value contribute to the fault.

12. The system of claim 11, wherein the initial set of test vectors provides complete pairwise coverage of the test space, wherein the fault is a pairwise error in the SUT, and wherein the at least one processor is configured to determine that the first original attribute value and the second original attribute value contribute to the fault by executing the computer-executable instructions to determine that the first original attribute value and the second original attribute value cause the pairwise error.

13. The system of claim 11, wherein the at least one processor is configured to detect and localize the fault based at least in part on the second set of execution results by executing the computer-executable instructions to determine a particular combination of attribute values that causes the fault.

14. The system of claim 13, wherein the at least one processor is further configured to execute computer-executable instructions to:

generate a regression bucket of failing test cases based at least in part on the particular combination of attribute values that causes the fault, wherein the regression bucket covers all possible combinations of the collection of attribute-value pairs that include the particular combination of attribute values that causes the fault.

15. A computer program product for detecting and localizing a fault in a System Under Test (SUT), the computer program product comprising a storage medium readable by a processing circuit, the storage medium storing instructions executable by the processing circuit to cause a method to be performed, the method comprising:

modeling inputs to the SUT as a collection of attribute-value pairs;

generating an initial set of test vectors that provides complete n-wise coverage of a test space associated with the collection of attribute-value pairs;

generating an initial set of test cases from the initial set of test vectors;

executing the initial set of test cases to obtain a first set of execution results;

determining, based at least in part on the first set of execution results, that one or more test cases failed execution;

selecting, from the one or more test cases that failed execution, a failing test case to identify a cause of failure, the failing test case tests a first attribute with a first value;

generating a set of new test cases from the selected failing test case, wherein generating the set of new test cases comprises changing the first value of the first attribute in the selected failing test case to a respective value in each new test case that is generated;

executing the set of new test cases to obtain a second set of execution results; and detecting and localizing the fault based at least in part on the second set of execution results.

16. The computer program product of claim 15, wherein changing the respective value in the selected failing test case to generate each new test case comprises changing the respective value to an attribute value that is not present in any of the one or more test cases that failed execution.

17. The computer program product of claim 15, wherein detecting and localizing the fault based at least in part on the second set of execution results comprises:

determining that a particular new test case failed execution; and determining that the attribute having the first value in the selected failing test case that was changed to obtain the particular new test case does not contribute to the fault.

18. The computer program product of claim 15, wherein detecting and localizing the fault based at least in part on the second set of execution results comprises:

determining that a first new test case and a second new test case each successfully executed;

determining a second attribute having a second original attribute value in the selected failing test case that was changed to generate the second new test case; and determining that the first value and the second original attribute value contribute to the fault.

19. The computer program product of claim 18, wherein the initial set of test vectors provides complete pairwise coverage of the test space, wherein the fault is a pairwise error in the SUT, and wherein determining that the first original attribute value and the second original attribute value contribute to the fault comprises determining that the first original attribute value and the second original attribute value cause the pairwise error.

20. The computer program product of claim 15, wherein detecting and localizing the fault based at least in part on the second set of execution results comprises determining a particular combination of attribute values that causes the fault, the method further comprising generating a regression bucket of failing test cases based at least in part on the particular combination of attribute values that causes the fault, wherein the regression bucket covers all possible combinations of the collection of attribute-value pairs that include the particular combination of attribute values that causes the fault.

* * * * *